United States Patent [19]

Anderson

[11] 3,937,260

[45] Feb. 10, 1976

[54] LOG SPLITTER

[76] Inventor: Max F. Anderson, Stewardson, Ill. 62463

[22] Filed: Dec. 13, 1973

[21] Appl. No.: 424,441

[52] U.S. Cl................. 144/193 A; 83/624; 144/2 N; 144/3 D; 144/34 R; 144/34 E; 144/309 R; 144/309 AC; 254/104

[51] Int. Cl.²........................ B27L 7/00; A47J 49/02

[58] Field of Search.......... 144/2 N, 3 D, 3 K, 34 R, 144/34 E, 34 B, 193 R, 193 A, 309 AC, 312, 326 R; 83/624; 254/104

[56] References Cited

UNITED STATES PATENTS

| | | | |
|---|---|---|---|
| 804,219 | 11/1905 | Gehl | 83/624 |
| 2,612,194 | 9/1952 | Ingraham et al. | 144/34 E |
| 3,834,436 | 9/1974 | Burkett | 144/326 R |

FOREIGN PATENTS OR APPLICATIONS

| | | | |
|---|---|---|---|
| 589,705 | 6/1947 | United Kingdom | 144/193 A |

*Primary Examiner*—Harrison L. Hinson
*Assistant Examiner*—W. D. Bray
*Attorney, Agent, or Firm*—Victor R. Beckman

[57] ABSTRACT

A log splitter and method for splitting logs, rails or the like, comprising a pair of double acting fluid cylinder operators in a parallel spaced side-by-side arrangement, which operators are interconnected by a butt plate extending therebetween against which one end of a log to be split may be butted. Means are provided for connecting the cylinders to a fluid source for simultaneous actuation thereof. A cutting or splitting blade is connected to the fluid cylinder operators through adjustable length connecting means such as chains, or the like, for use with logs of different length including those of greater length than the stroke of the fluid cylinder pistons. The log splitter is lightweight, portable, and readily adapted for connection to the fluid pressure source of a tractor, or the like, for use thereof in the field. The novel log splitting method includes performing successive splitting operations on a log by shortening the adjustable length connecting means after each cutting stroke.

11 Claims, 2 Drawing Figures

LOG SPLITTER

BACKGROUND OF THE INVENTION

Figure 1:
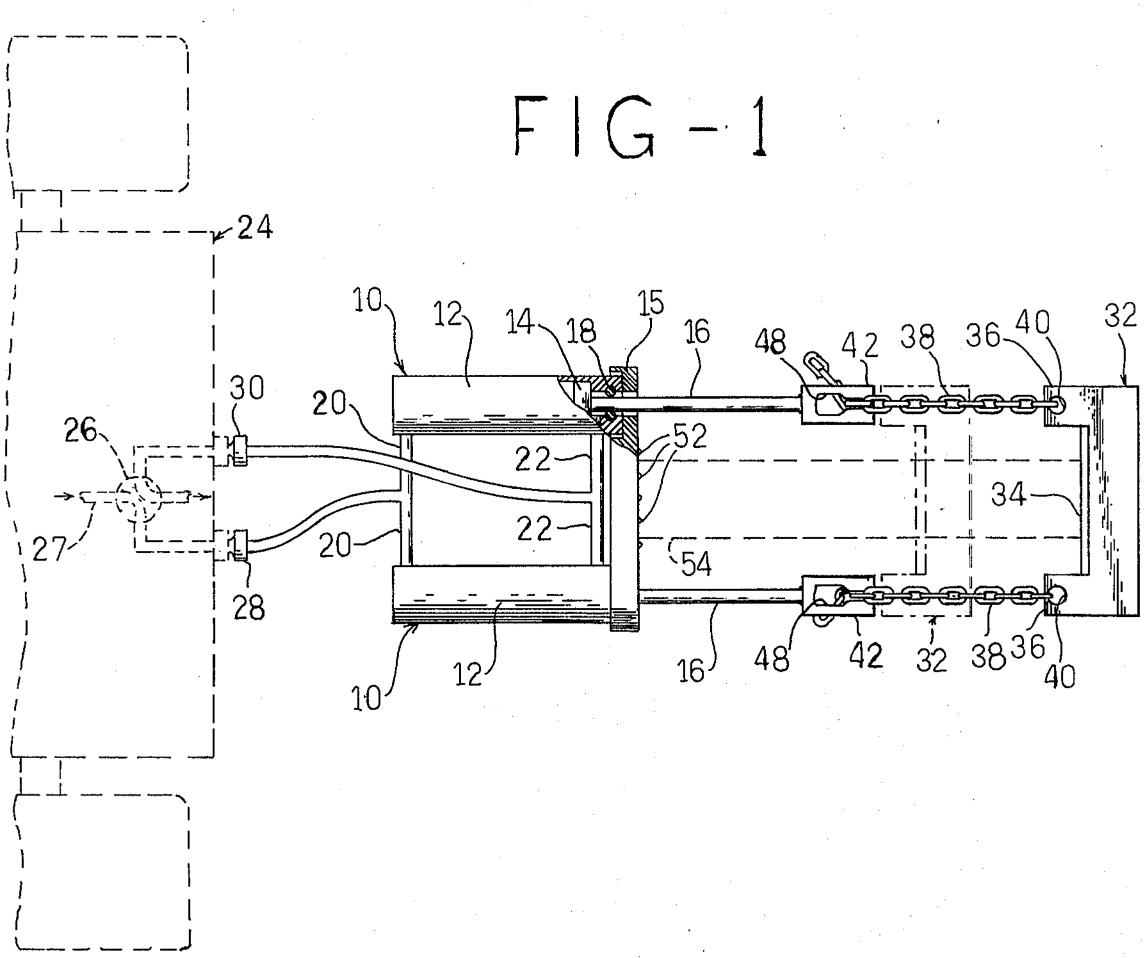

This invention relates to a protable log splitter for quickly and easily splitting logs and the like.

Log splitters are well known, including fluid cylinder operated splitters. Many prior art log splitters are provided with a sturdy base formed of an I-beam, or the like, for the support of the log to be split, and for slideable support of an axially movable hydraulically operated wedge or blade therealong. Such prior art arrangements are of such large mass and weight that they must be supplied with wheels for portability. They are very expensive, not readily portable, and are limited in the maximum length log which may be split.

An object of this invention is the provision of a log splitter which overcomes the above mentioned shortcomings and difficulties of the prior art and has many advantages thereover.

An object of this invention is the provision of a log splitter of simple and inexpensive design and construction readily adaptable for wide use.

An object of this invention is the provision of a log splitting method and apparatus which are not inherently limited in the length of logs which may be split thereby.

The above and other objects and advantages of the invention are achieved by means of an arrangement which includes a pair of fluid operators of the cylinder and piston type arranged in parallel relation and facing in the same direction. A butt plate, against which one end of a log to be split is positioned, extends between the cylinders and the piston rods extend through clearance holes therein. The piston rods are attached to a cutting or splitting blade through adjustable length interconnecting means such as chains, wire, wire rope, block and tackle arrangements, or the like. The log to be cut is positioned between the butt plate and cutting blade and, with the piston rods in extended position, the adjustable interconnecting means are adjusted to accommodate the log length. The fluid operators then are actuated to retract the piston rods to draw the cutting blade through the log. If the log is not completely split upon complete retraction of the piston rods the piston rods may be extended, the adjustable interconnecting means shortened, and the piston rods again retracted to effect another cutting operation.

Figure 2:
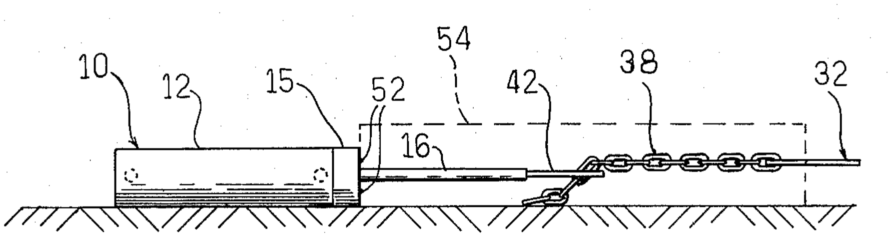

The invention and other objects and advantages thereof will be better understood from the following description taken in connection with the accompanying drawings. In the drawings wherein like reference characters denote the same parts in the views:

FIG. 1 is a plan view of a log splitting apparatus which embodies this invention, with part shown broken away for clarity, and showing the same connected to a fluid pressure source provided by a tractor; and FIG. 2 is a side elevational view of the log splitter shown in FIG. 1.

Referring to the drawings, the illustrated embodiment of the log splitter is shown comprising a pair of double acting fluid operators 10 each of which includes a cylinder 12 having a reciprocally mounted piston 14 therein, one of which pistons is seen in FIG. 1. A butt plate 15 extends between the parallel extending cylinders against which the forward ends of the cylinders are butted in use. In the illustrated arrangement recesses are formed in the butt plate to receive the ends of the cylinders, and the piston rods 16 extend through clearance apertures in the butt plate. The resultant loose connection allows the cylinders to extend at an angle, other than the illustrated ninety degree angle, with the plane of the butt plate. Seal rings 18 at the forward end of the operators provide a fluid tight seal between the piston rods and cylinders.

The fluid operators 10 preferably are of the double acting type such that when fluid pressure is applied to one end thereof through lines 20 while the other end of the cylinders are vented through lines 22 the piston rods are extended into the illustrated positions. The piston rods are retracted, for log splitting operation as described below, when the fluid pressure is applied to the other end of the cylinders through lines 22 while the opposite end of the cylinders are vented.

Often tractors, such as the tractor 24 shown in broken lines in FIG. 1 are provided with a fluid pressure source, which conveniently may be used to operate the log splitter of my invention. The illustrated tractor is shown provided with a control valve 26 whereby fluid under pressure at supply line 27 from a source not shown may be directed to either one of two coupling members 28 and 30, while the other coupling member is vented to the fluid reservoir not shown (or to the atmosphere in the use of an air pressure system instead of a hydraulic system). Many types of tractors, including farm tractors, are provided with a fluid pressure source for operation of auxiliary equipment, and no further description thereof is required.

The fluid operators 10 are used to actuate a cutting or splitting blade 32. Although different blade configurations may be used, the illustrated blade is of generally rectangular shape with a straight sharpened log cutting, or splitting, edge 34. Tangs, 36 at opposite ends of the blade extend from the blade cutting edge 34 to provide means whereby the blade may be pulled, rather than pushed, through the log. Adjustable length flexible interconnecting means 38 connect the blade to the piston rods. In the exemplary arrangement, the connecting means 38 comprise chains which have one end link connected to the blade through apertures 40 in the tangs. The effective chain length is readily adjustable by means of the releasable connecting means between the chains and piston rods, which connecting means include connecting plates 42 attached as by welding or the like to the outer ends of the piston rods 16. The plates are formed with elongated apertures 48 having an enlarged end through which the chain links may be passed, and a narrow width end extending toward the blade into which a single link may be extended, as illustrated. With one chain link extending through the narrow end of the aperture, the adjacent links are engagable with a surface of the plate to prevent pulling of the chain therethrough without first sliding the one link to the enlarged end of the aperture. Adjustment of the chain lengths to accomodate logs of different length is easily and readily effected by providing sufficient slack in the chain to allow for passage thereof through the enlarged portion of the apertures 48.

A log 54 to be split is shown in broken lines in the drawings. The fluid operators 10 and associated mechanism are of sufficiently light weight to be readily carried by an individual, whereas logs often are heavy and not easily handled. In use, therefore, logs left lying upon the ground where they have been felled may be cut to length and split without having to lift the same off the ground. With the present arrangement the log splitter is placed with the butt plate 15 against one end of the log. To prevent slipping thereacross as the log is being split the butt plate may be provided with pointed protrusions 52 engageable with the log end. In the illustrated arrangement the cylinders rest directly upon the ground. For splitting larger logs it will be apparent that one or both cylinders could be supported above ground level on a suitable supporting means for extension of the blade across the log adjacent the center of the log. The pistion rods 16 are actuated to their extended condition by application of fluid pressure through line 20, and the cutting blade 32 is placed adjacent the opposite end of the log. The chains 38 are extended through the apertures 48 to a minimum possible effective chain length. A wooden block, or the like, not shown may be used to support the blade at the desired level while setting up for the splitting operation. With the splitting apparatus in position such as shown in the drawings, the valve 26 is turned for actuation of the fluid operators for retraction of the piston rods whereupon the blade 32 is drawn through the log to split the same.

With the piston rods fully retracted, the blade 32 is actuated to the broken line position thereof shown in FIG. 1. The amount of blade travel may or may not be sufficient to result in complete splitting of the log to the opposite end. If the log is not completely split, the piston rods are reextended, the effective chain lengths are shortened, and the piston rods are again retracted. The splitting operations are repeated as necessary to substantially completely split the log, or until the minimum chain length is reached, at which point no further power operated splitting generally is required. If desired, a block of wood, or the like, could be placed between the butt plate 15 and log 54 to provide for blade travel for the complete length of the log.

The invention having been described in detail in accordance with the requirements of the Patent Statutes, various changes and modifications will suggest themselves to those skilled in the art. For example, the butt plate 15 may be fixedly attached to the cylinders, as by welding, rather than loosely secured thereto. Also, the butt plate may be secured to the cylinders at any desired position therealong, including the opposite end thereof. Also, other shaped cutting blades may be used, including generally V or U-shaped blades, as viewed from above. Additionally, blades of increased thickness for greater wedging and splitting action may be used.

The adjustable length interconnecting means are not limited to those illustrated. For example, the chains could be provided with hooks at their free ends engagable with the chain links. With such an arrangement a loop may be formed at the chain end for engagement with a suitable aperture in the plate 42. The need for the narrow elongated end of the openings 48 would be eliminated with such an arrangement. Obviously, the adjustment means for adjusting the chain length may be at the blade end rather than piston end of the chain if desired. Further, opposite ends of the chain may be fixed and adjustment of chain length may be effected intermediate thereof. Also, means such as wire, wire rope, or the like with suitable releasable connectors may be used as the adjustable length connecting means in lieu of the illustrated chains. In addition, block and tackle arrangements may be included in the connecting means to provide an increased mechanical advantage for splitting hard to split logs. It is intended that the above and other such changes and modifications shall fall within the spirit and scope of the invention as defined in the appended claims.

I claim:

1. A portable log splitter for splitting generally horizontally positioned logs lying on the ground comprising, a pair of spaced fluid operators in generally parallel extending position, a butt plate extending between said fluid operators and adapted to abut one end of a log to be split, a splitting blade, and means for connecting said blade to said operators, said blade and butt plate being relatively movable together for splitting operation of a log extending therebetween upon actuation of the fluid operators in a direction to draw the blade toward the butt plate.

2. The portable log splitter as defined in claim 1 wherein said fluid operators each comprise a fluid cylinder and piston reciprocably mounted therewithin.

3. The portable log splitter as defined in claim 2 wherein said fluid operators are double acting for actuation in both piston directions.

4. The portable log splitter as defined in claim 1 wherein said connecting means are of adjustable length.

5. The portable log splitter as defined in claim 4 wherein said adjustable length connecting means comprise chains.

6. The portable log splitter as defined in claim 1 wherein said fluid operators each include a cylinder having a piston reciprocably movable therewithin and a piston rod attached to the piston and extending from one end of the cylinder, said fluid cylinders engaging said butt plate adjacent the end from which said piston rods extend.

7. The portable log splitter as defined in claim 6 wherein said connecting means comprise flexible members connecting said blade to said piston rods.

8. The portable log splitter as defined in claim 7 including means for adjusting the effective length of said flexible members to accomodate logs of different lengths and for successive shortening thereof in splitting a log.

9. The portable log splitter as defined in claim 8 wherein said flexible members comprise chains.

10. A method of splitting a generally horizontally positioned log lying on the ground comprising, positioning at opposite ends of a log to be split a butt plate and splitting blade which are interconnected by a pair of adjustable length connecting means extending longitudinally of the log at opposite sides thereof, and drawing the splitting blade toward said butt plate to split the log.

11. The log splitting method as defined in claim 10 including, shortening the adjustable length connecting means after the first splitting operation and repeating said drawing step to further split the log.

* * * * *